Sept. 15, 1970  R. N. STENERSON  3,528,688
BRAZED JOINTS

Original Filed Aug. 30, 1966

*INVENTOR.*
RANDOLPH N. STENERSON.
BY *Frank N. Decker Jr.*
ATTORNEY.

United States Patent Office 3,528,688
Patented Sept. 15, 1970

3,528,688
BRAZED JOINTS
Randolph N. Stenerson, Dewitt, N.Y., assignor to Carrier Corporation, Syracuse, N.Y., a corporation of Delaware
Original application Aug. 30, 1966, Ser. No. 576,047, now Patent No. 3,465,422, dated Sept. 9, 1969. Divided and this application June 14, 1968, Ser. No. 737,222
The portion of the term of the patent subsequent to Aug. 31, 1984, has been disclaimed
Int. Cl. F16l 13/02
U.S. Cl. 285—286     5 Claims

ABSTRACT OF THE DISCLOSURE

A brazed metal joint and method of making the same. An inorganic fused glass matrix containing an unsintered brazing alloy powder is placed adjacent the members to be formed. The brazing preform is heated to release the brazing alloy to the joint members and to form a protective glass coating about the joint members which prevents splattering and oxidation.

CROSS REFERENCE TO RELATED APPLICATION

This application is a division of my co-pending application Ser. No. 576,047, filed Aug. 30, 1966, now Pat. No. 3,465,422, granted Sept. 9, 1969.

BACKGROUND OF THE INVENTION

This invention relates to brazed joints, and more particularly, to an improved brazed joint and method of making the same Conventional techniques for making brazed joints between steel joint forming members with corrosion resistant brazing alloys have not proved entirely satisfactory. Corrosion resistant brazing alloys are characteristically hard and brittle so that they are not readily formed into convenient shapes for brazing. Consequently, in the past, such alloys have usually been used in cast shapes or in powder form as sintered compacts or pastelike slurries to facilitate application of the brazing metal to the joint forming members. A number of serious problems, however, have been encountered when the joint members and the brazing alloy are heated to form the brazed joint. For example, the brazing alloy is often splattered away from the region of the joint being formed during the heating process resulting in loss of metal and an inferior joint. Also, oxidation of both the brazing metal and the joint forming members has resulted in internal voids and flaws which are difficult or impossible to visually detect but which impair the mechanical properties of the joint. Also, brazing metal may be blown out of the vicinity of the joint when direct flame impingement is employed to braze the joint. In addition, a problem exists due to the tendency of the brazing metal to flow down the outside of the joint forming members and be lost from the region of the joint. Also, in order to provide a location for a sufficient quantity of a slurry of the brazing alloy, excessive joint clearances are often provided which make inspection of the final joint both during and after brazing difficult due to loss of brazing metal from sight in the clearance space, and which tends to render the final joint excessively subject to failure due to vibration or other mechanical stresses imposed on it. These problems are aggravated when an organic binder is used with the powdered brazing metal due to combustion or vaporization of the binder which tends to cause splattering of the brazing metal from the joint region.

Accordingly, it is a principal object of this invention to provide an improved brazed joint and method of making the same which overcomes difficulties experienced in prior brazed joints and brazing techniques.

SUMMARY OF THE INVENTION

In accordance with this invention, a brazed joint is made by positioning a completely inorganic brazing preform comprising a powdered brazing metal suspended in an inorganic shaped glass matrix in the region of the metal members to be joined. The joint members and brazing preform are heated to a temperature above the softening point of the glass matrix and above the liquidus temperature of the brazing metal. The powdered brazing metal tends to coalesce and flow within the glass matrix toward the region of the members being joined while the glass matrix, which has a substantially higher viscosity, remains on the exterior of the joint as a protective glass coating during the brazing process. This brazing process has been found to form a desirable exterior and interior brazing fillet at the joint. At the same time, the protective viscous glass coating shields the brazing metal from being blown or from sputtering out of the region of the joint being formed and prevents the brazing metal from flowing down the outside of the joint members. Consequently, all of the brazing metal is applied directly to the joint region. A visible exterior fillet of brazing metal is formed which facilitates visible inspection of the finished joint. Likewise, the protective glass coating prevents oxidation of both the joint forming members and of the brazing metal during formation of the joint thereby eliminating internal voids and flaws and resulting in a superior joint.

Preferably, the glass matrix has a coefficient of thermal expansion substantially different from the coefficient of expansion of the members being joined so that upon cooling of the joint, spalling of the glass is promoted and the protective coating is automatically removed from the region of the joint.

DESCRIPTION OF THE PREFERRED EMBODIMENT

Figure 1:
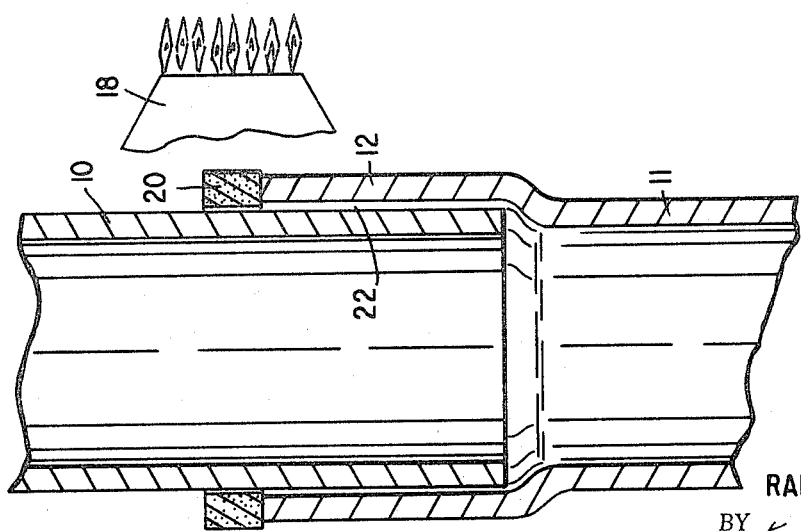
FIG. 1 illustrates a cross section through an assembled pair of tubular joint members prior to brazing.

The method of making a brazed metal joint in accordance with this invention is illustrated in the drawings. Referring particularly to FIG. 1, there is shown a pair of tubular metal joint members 10 and 11 which are to be joined. Joint member 11 is provided with an enlarged diameter bell portion 12 in which the end of joint member 10 is telescopically received. The radial clearance between bell member 12 and the exterior surface of joint member 10 is exaggerated in the drawing for purposes of illustration. Desirably, this clearance may be on the order of from about .0015 inch to about .007 inch which provides a clearance of capillary size for the flowing of brazing metal. The relatively tight engagement between the joint members which can be used in accordance with this invention is desirable because it provides good mechanical rigidity which reduces the tendency of failure of the resulting brazed joint due to vibration or other forces of applied stress. A relatively tight joint clearance also assists in the manufacturing of joints because a heat exchanger or subassembly can be preassembled and thereafter subjected to an automated brazing operation. This feature overcomes the difficulties experienced in prior brazing techniques where joint clearances had to be large in order to capture or retain sufficient brazing powder, paste or slurry to enable an adequate joint to be formed.

Prior to assembly of the joint shown in FIG. 1, a close fitting, inorganic brazing preform 20 is slipped over the end of spigot member 10. After the spigot member is assembled in bell 12, brazing preform 20 is slid into engagement with the vertically upper surface of the spigot. Brazing preform 20 comprises a brazing metal such as a corrosion resistant alloy of nickel, iron, silicon, and boron, in finely divided powder form, homogeneously suspended in an inorganic fused glass matrix of suitable composition and physical properties. A preferred brazing preform comprises a powdered brazing metal which consists essentially of about 42% iron, about 4.5% silicon, about 3.25% boron and about 50.25% nickel suspended in glass matrix which comprises about 20% to about 30% boron oxide, about 40% to about 50% silicon dioxide, about 20% of the oxides of at least one of the metals of the group consisting of calcium, barium and strontium, and about 10% of the oxides of at least one of the metals of the group consisting of sodium, potassium, and lithium.

Figure 2:
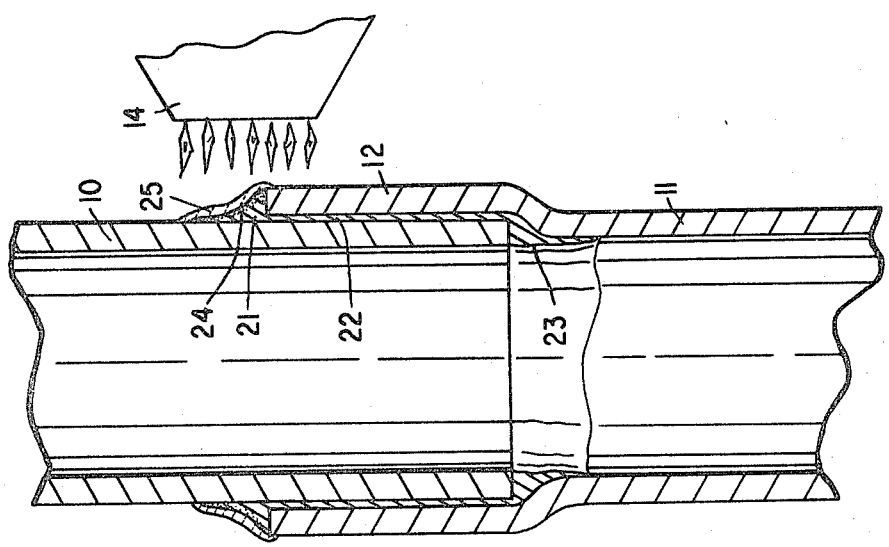
FIG. 2 illustrates a cross section through a joint during the brazing operation showing the formation of a protective fused glass coating over the outside of a joint.

After assembly of the joint forming members, heat is applied to the joint as illustrated in FIG. 2, such as by a pair of diametrically opposed radiant gas burners 18 and 14 having a flame directly impinging on the brazing preform and the joint area. FIG. 2 illustrates the condition of the joint at a point near the end of the brazing operation. The brazing metal in preform 20 has been heated above its liquidus temperature (at which the metal is completely liquid and flowable) which is also above the softening temperature of the glass matrix (which can be roughly defined as the temperature at which visible distortion of the glass matrix begins to take place). The viscosity of the brazing metal at its liquidus temperature and at the brazing temperature is substantially less than the viscosity of the glass matrix at the same temperature so that the suspended brazing metal in the preform melts, coalesces and flows within the glass matrix toward and between the members being joined.

At the same time, the more viscous softened glass of the matrix is unable to flow into the joint and begins to form a protective fused glass coating 25 over the outside of the joint being formed. Protective coating 25 shields both the brazing metal and the joint being brazed from impingement of the gas flame and from atmospheric oxygen or other ambient atmosphere surrounding the joint. Consequently, oxidation of both the brazing metal and of the joint forming surfaces is prevented by protective glass coating 25. Similarly, protective glass coating 25 prevents mechanical blowing of the allow particles from the region of the joint being formed so that all of the brazing metal in the brazing preform is applied directly to the joint being formed.

It appears that during heating of the glass preform and formation of the brazed joint, the brazing metal particles in the brazing preform, after being heated to their liquidus temperature, migrate through the glass matrix and coalesce with each other as they travel toward the joint being formed. The liquid brazing metal flows down the capillary space 22 between bell 12 and joint 10 while the glass remains on the exterior of the joint being formed. The formation of protective glass coating 25 about the exterior of the joint being formed may assist in migration of the liquid brazing metal particles toward the region of the joint by a surface tension effect. In any event, protective coating 25 is effective to avoid loss of brazing alloy from the joint region and results in forming a superior joint by greatly inhibiting oxidation of the joint surfaces and the brazing metal. A lower fillet 23 as well as an upper fillet 21 of brazing metal is formed by the brazing technique described and capillary space 22 is also filled with brazing metal. However, the glass matrix of preform 20 does not flow through capillary space 22 due to its greater viscosity at the brazing temperature and the glass in the matrix remains on the exterior portions of the joint as a protective coating.

Figure 3:
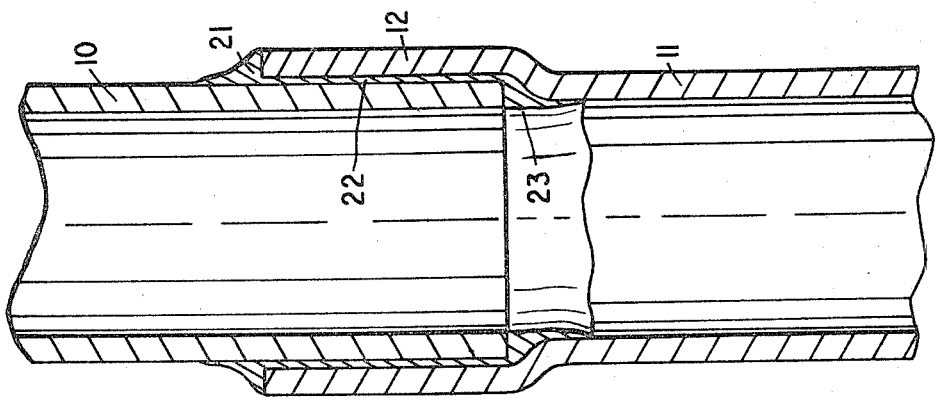
FIG. 3 illustrates a cross section through a completed joint after cooling and spalling of the protective glass coating.

FIG. 3 illustrates the completed joint after cooling and solidification of the brazing metal. Preferably, the glass matrix in preform 20 has a coefficient of expansion substantially different, and preferably substantially less, than the coefficient of expansion of the metal of joint members 10 and 12 so that spalling of the protective glass coating 25 occurs upon cooling of the joint. The spalling of the glass coating causes it to break up and flake off the joint so that little or no glass coating remains to be cleaned from the joint and the surface is in good condition for subsequent cleaning or painting to provide a neat finished appearance.

Visual inspection of the completed joint is facilitated by the fact that upper fillet 21 is clearly exposed to view. This feature is of considerable importance since the interior of a brazed joint is impossible to visually inspect in a completed assembly and reliance must be placed on the exteriorly visible portion of the joint to determine whether a satisfactory joint has been made. In prior joints, where impingement of the brazing flame caused blowing of material from the region of the joint or where deep large clearance bell members were required to hold an adequate amount of brazing metal, an easily observable exterior fillet was often not formed and visual inspection of the joint was rendered exceedingly difficult. In a joint made in accordance with this invention, the condition of the exterior or upper fillet 21 provides a good indication of the condition of the remaining joint because the protective glass coating inhibits oxidation thereby reducing the likelihood of a serious hidden internal flaw.

By use of this technique of joint brazing, both oxidation of the joint being formed and oxidation of the brazing metal is substantially inhibited by the glass coating, thus resulting in a superior brazed joint which is free of voids and other defects associated with oxidation. The brazing metal and the glass matrix of the compositions described tend to make the brazing metal self-fluxing to clean and to inhibit oxidation of the brazing metal and joint members, and to improve the wetability of the joint and brazing metal thereby providing a better finished joint.

A joint made in accordance with this invention may employ a minimum amount of brazing metal because loss of metal by splattering and sputtering is prevented by the glass matrix. Similarly, blowing of the brazing alloy out of the region of the joint being formed is also prevented by the glass matrix. A joint made in accordance with this invention does not require a large joint clearance or special shapes, as is often the case where pastes, slurries, or conventional preforms are employed. The bulkiness of slurries often require extra recessing to assure retention of the material during heating.

Because of the rigid glass matrix, excess brazing metal is not required to make a mechanically rigid brazing preform and the cost of the required alloy is reduced. Also, the resulting joint can be visually inspected because of the formation of an exterior fillet indicative of the joint quality. Further, this method is adaptable to automated brazing techniques with a high degree of reliability because mechanized methods of preform manufacture tend to minimize human element such as is involved with application of paste or slurry.

I claim:
1. A brazed joint between metal members comprising:
(a) a first metal member and a second metal member, said first metal member having a surface positioned adjacent to and in spaced relation with a surface of said second metal member;
(b) a quantity of brazing metal disposed between and in contact with both of said adjacent surfaces of said metal members; and (c) a protective glass coating disposed over said brazing metal at a location effective to reduce contact between said brazing metal and ambient atmosphere.

2. A brazed joint between metal members as defined in claim 1 wherein said protective glass coating includes a fluxing agent.

3. A brazed joint between metal members as defined in claim 1 wherein said brazing metal comprises an alloy of iron, silicon, boron, and nickel, and said protective glass coating comprises a borosilicate glass.

4. A brazed joint between metal members as defined in claim 1 wherein said brazing metal consists essentially of about 42% iron, about 4.5% silicon, about 3.25% boron and about 50.25% nickel.

5. A brazed joint between metal members as defined in claim 1 wherein said brazing metal consists essentially of about 42% iron, about 4.5% silicon, about 3.25% boron and about 50.25% nickel; and said protective glass coating comprises about 20% to about 30% boron oxide, about 40% to 50% silicon dioxide, about 20% of the oxides of at least one of the metals of the group consisting of calcium, barium and strontium, and about 10% of the oxides of at least one of the metals of the group consisting of sodium, potassium and lithium.

References Cited

UNITED STATES PATENTS

| | | | |
|---|---|---|---|
| 2,661,282 | 12/1953 | Daley | 228—56 X |
| 2,815,729 | 12/1957 | Goodman | 29—496 X |
| 2,848,802 | 8/1958 | Luks. | |
| 2,908,072 | 10/1959 | Johnson | 228—56 X |
| 3,047,383 | 7/1962 | Slayter | 29—182.5 X |
| 3,172,385 | 3/1965 | Varsane | 29—496 X |
| 3,221,970 | 12/1965 | Lockshin | 228—56 |
| 3,350,179 | 10/1967 | Stenerson | 29—496 X |
| 3,439,858 | 4/1969 | Ando et al. | 228—56 |

DAVE W. AROLA, Primary Examiner

U.S. Cl. X.R.

285—422; 228—56; 29—500